US012464293B2

(12) United States Patent
Scheek et al.

(10) Patent No.: US 12,464,293 B2
(45) **Date of Patent: *Nov. 4, 2025**

(54) SPEAKER UNIT WITH A SPEAKER FRAME AND TWO OPPOSING SOUND PRODUCING MEMBRANES

(71) Applicant: Mayht Holding B.V., Santa Barbara, CA (US)

(72) Inventors: Timothy Ruben Scheek, Rotterdam (NL); Mattias Jeffrey Scheek, Amsterdam (NL)

(73) Assignee: Mayht Holding B.V., Goleta, CA (US)

( * ) Notice: Subject to any disclaimer, the term of this patent is extended or adjusted under 35 U.S.C. 154(b) by 265 days.

This patent is subject to a terminal disclaimer.

(21) Appl. No.: 18/309,393

(22) Filed: Apr. 28, 2023

(65) Prior Publication Data

US 2023/0379633 A1 Nov. 23, 2023

Related U.S. Application Data

(63) Continuation of application No. PCT/EP2021/080612, filed on Nov. 4, 2021, which is (Continued)

(51) Int. Cl.
*H04R 9/06* (2006.01)
*H04R 9/04* (2006.01)

(52) U.S. Cl.
CPC ............ *H04R 9/063* (2013.01); *H04R 9/043* (2013.01); *H04R 2400/07* (2013.01)

(58) Field of Classification Search
CPC .... H04R 9/063; H04R 9/043; H04R 2400/07; H04R 2231/003; H04R 2307/00;
(Continued)

(56) References Cited

U.S. PATENT DOCUMENTS 5,440,644 A 8/1995 Farinelli et al.
5,761,320 A 6/1998 Farinelli et al.
(Continued)

FOREIGN PATENT DOCUMENTS

EP 1186352 A1 3/2002
EP 1389853 A1 2/2004
(Continued)

OTHER PUBLICATIONS

AudioTron Quick Start Guide, Version 1.0, Mar. 2001, 24 pages.
(Continued)

*Primary Examiner* — Mark Fischer
(74) *Attorney, Agent, or Firm* — Fortem IP LLP

(57) ABSTRACT

A speaker unit with a speaker frame and two opposing membranes each being arranged to move up and down along a main speaker axis. Two drive units are present for each membrane, having a driver static part and a driver moving part. A sealing edge suspension is connected to a perimeter of the associated membrane and to the major front surface and major back surface of the speaker unit, respectively. For each driver moving part, a spider arm suspension is present for suspending the driver moving part to the speaker frame in a flexible manner. The sealing edge suspension is at least partially positioned above the associated drive units when viewed in a direction parallel to the main speaker axis.

18 Claims, 5 Drawing Sheets

Figure 1:
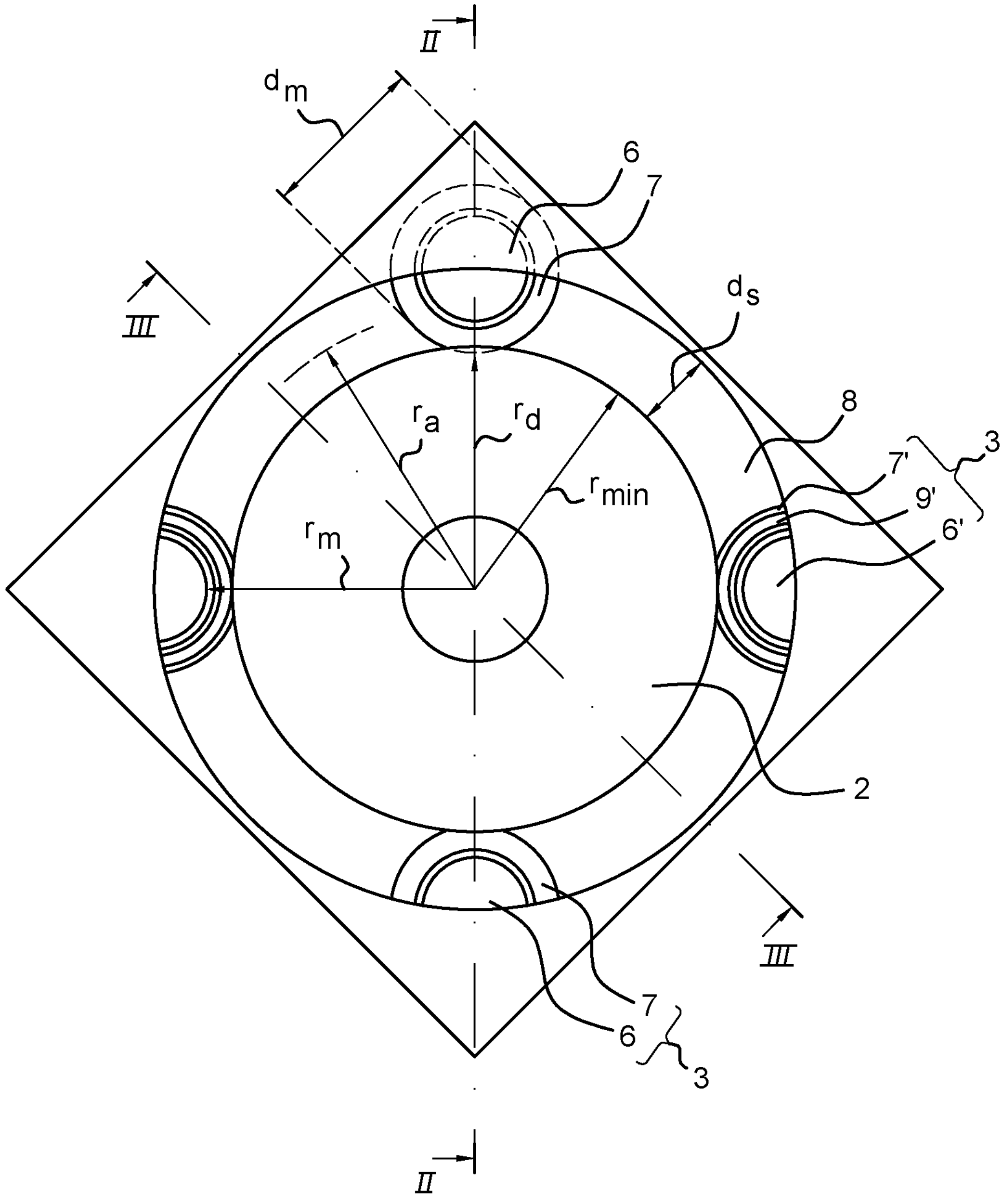

Related U.S. Application Data a continuation of application No. 17/088,624, filed on Nov. 4, 2020, now Pat. No. 11,166,107.

(58) Field of Classification Search

CPC ...... H04R 2307/201; H04R 7/12; H04R 7/20; H04R 1/22; H04R 2207/00; H04R 7/16; H04R 7/18; H04R 2400/11

See application file for complete search history.

(56) References Cited

U.S. PATENT DOCUMENTS

| | | | | |
|---|---|---|---|---|
| 5,923,902 | A | 7/1999 | Inagaki | |
| 6,032,202 | A | 2/2000 | Lea et al. | |
| 6,256,554 | B1 | 7/2001 | DiLorenzo | |
| 6,404,811 | B1 | 6/2002 | Cvetko et al. | |
| 6,469,633 | B1 | 10/2002 | Wachter | |
| 6,522,886 | B1 | 2/2003 | Youngs et al. | |
| 6,611,537 | B1 | 8/2003 | Edens et al. | |
| 6,631,410 | B1 | 10/2003 | Kowalski et al. | |
| 6,757,517 | B2 | 6/2004 | Chang | |
| 6,778,869 | B2 | 8/2004 | Champion | |
| 7,130,608 | B2 | 10/2006 | Hollstrom et al. | |
| 7,130,616 | B2 | 10/2006 | Janik | |
| 7,143,939 | B2 | 12/2006 | Henzerling | |
| 7,236,773 | B2 | 6/2007 | Thomas | |
| 7,295,548 | B2 | 11/2007 | Blank et al. | |
| 7,391,791 | B2 | 6/2008 | Balassanian et al. | |
| 7,483,538 | B2 | 1/2009 | McCarty et al. | |
| 7,571,014 | B1 | 8/2009 | Lambourne et al. | |
| 7,630,501 | B2 | 12/2009 | Blank et al. | |
| 7,643,894 | B2 | 1/2010 | Braithwaite et al. | |
| 7,657,910 | B1 | 2/2010 | McAulay et al. | |
| 7,853,341 | B2 | 12/2010 | McCarty et al. | |
| 7,987,294 | B2 | 7/2011 | Bryce et al. | |
| 8,014,423 | B2 | 9/2011 | Thaler et al. | |
| 8,045,952 | B2 | 10/2011 | Qureshey et al. | |
| 8,103,009 | B2 | 1/2012 | McCarty et al. | |
| 8,234,395 | B2 | 7/2012 | Millington | |
| 8,483,853 | B1 | 7/2013 | Lambourne | |
| 8,942,252 | B2 | 1/2015 | Balassanian et al. | |
| 10,681,465 | B1 | 6/2020 | Castillo | |
| 11,166,107 | B1 * | 11/2021 | Scheek | H04R 9/063 |
| 2001/0042107 | A1 | 11/2001 | Palm | |
| 2002/0022453 | A1 | 2/2002 | Balog et al. | |
| 2002/0026442 | A1 | 2/2002 | Lipscomb et al. | |
| 2002/0124097 | A1 | 9/2002 | Isely et al. | |
| 2003/0157951 | A1 | 8/2003 | Hasty, Jr. | |
| 2004/0024478 | A1 | 2/2004 | Hans et al. | |
| 2006/0126886 | A1 | 6/2006 | Combest | |
| 2007/0142944 | A1 | 6/2007 | Goldberg et al. | |
| 2020/0296502 | A1 * | 9/2020 | Scheek | H04R 9/06 |

FOREIGN PATENT DOCUMENTS

| | | | | |
|---|---|---|---|---|
| WO | 200153994 | | 7/2001 | |
| WO | 2003093950 | A2 | 11/2003 | |
| WO | WO-2019086357 | A1 * | 5/2019 | H04R 1/2873 |
| WO | 2019117706 | A1 | 6/2019 | |
| WO | 2020160791 | A1 | 8/2020 | |

OTHER PUBLICATIONS

AudioTron Reference Manual, Version 3.0, May 2002, 70 pages.

AudioTron Setup Guide, Version 3.0, May 2002, 38 pages.

Bluetooth. "Specification of the Bluetooth System: The ad hoc SCATTERNET for affordable and highly functional wireless connectivity," Core, Version 1.0 A, Jul. 26, 1999, 1068 pages.

Bluetooth. "Specification of the Bluetooth System: Wireless connections made easy," Core, Version 1.0 B, Dec. 1, 1999, 1076 pages.

Dell, Inc. "Dell Digital Audio Receiver: Reference Guide," Jun. 2000, 70 pages.

Dell, Inc. "Start Here," Jun. 2000, 2 pages.

"Denon 2003-2004 Product Catalog," Denon, 2003-2004, 44 pages.

International Bureau, International Search Report and Written Opinion mailed on Mar. 15, 2022, issued in connection with International Application No. PCT/EP2021/080612, filed on Nov. 4, 2021, 12 pages.

Jo et al., "Synchronized One-to-many Media Streaming with Adaptive Playout Control," Proceedings of SPIE, 2002, pp. 71-82, vol. 4861.

Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.

Louderback, Jim, "Affordable Audio Receiver Furnishes Homes With MP3," TechTV Vault. Jun. 28, 2000 retrieved Jul. 10, 2014, 2 pages.

Palm, Inc., "Handbook for the Palm VII Handheld," May 2000, 311 pages.

Presentations at WinHEC 2000, May 2000, 138 pages.

*Sonos, Inc.* v. *D&M Holdings* (No. 14-1330-RGA), DI 219, Claim Construction Opinion (Jan. 12, 2017) (24 pages).

United States Patent and Trademark Office, U.S. Appl. No. 60/490,768, filed Jul. 28, 2003, entitled "Method for synchronizing audio playback between multiple networked devices," 13 pages.

United States Patent and Trademark Office, U.S. Appl. No. 60/825,407, filed Sep. 12, 2006, entitled "Controlling and manipulating groupings in a multi-zone music or media system," 82 pages.

UPnP; "Universal Plug and Play Device Architecture," Jun. 8, 2000; version 1.0; Microsoft Corporation; pp. 1-54.

Yamaha DME 64 Owner's Manual; copyright 2004, 80 pages.

Yamaha DME Designer 3.5 setup manual guide; copyright 2004, 16 pages.

Yamaha DME Designer 3.5 User Manual; Copyright 2004, 507 pages.

* cited by examiner

SPEAKER UNIT WITH A SPEAKER FRAME AND TWO OPPOSING SOUND PRODUCING MEMBRANES

CROSS-REFERENCE TO RELATED APPLICATIONS

The present application is a continuation of International Application No. PCT/EP2021/080612, filed Nov. 4, 2021, which is a continuation of U.S. patent application Ser. No. 17/088,624, filed Nov. 4, 2020, now U.S. Pat. No. 11,166, 107, each of which is incorporated by reference herein in its entirety.

FIELD OF THE INVENTION

The present invention relates to a speaker unit.

BACKGROUND

Speaker units are well known in the prior art, such as speaker transducers comprising a cone shape speaker membrane and a membrane driver or actuator coaxially arranged with respect to the speaker membrane at a back side thereof. Planar type speaker units are also known in the art, wherein the speaker transducer comprise a planar speaker membrane and a plurality of membrane drivers arranged along a surface of the speaker membrane. Although the well-known coaxial cone shaped speaker transducers allow for high performance and fidelity, they are less suitable for smaller loud speaker systems due to the coaxial arrangement of the speaker membrane and membrane driver. Planar type speaker transducers do allow for flatter loudspeaker designs because of the substantially flat speaker membrane.

International patent publication WO2019/117706 discloses a speaker device having a frame, two opposite directed diaphragms, and two speaker drivers, each having at least one magnetic driver for driving the two opposite directed diaphragms in operation. A speaker damper is associated with each of the two opposite directed diaphragms, and has a coil bracket arranged to be driven by the associated at least one magnetic driver, a diaphragm connection member arranged to fixedly attach the diaphragm to the speaker damper, and a damper frame connection member arranged to fixate the speaker damper to the frame. The speaker damper further comprises a damper leg member arranged between the diaphragm connection member and the damper frame connection member.

US patent publication US2010/0172535 discloses a spider arrangement for an electromagnetic vibrator such as a speaker unit. An outer rim of the spider arrangement is provided for mounting a supporting frame of the electromagnetic vibrator, as well as an inner rim coaxially aligning with the outer rim for mounting to an induction coil of the electromagnetic vibrator. A plurality of suspension arms radially and evenly extend from the inner rim to the outer rim to enable the inner rim to be moved axially.

US patent publication US2011/0075880 discloses a damper for a speaker system for improving dynamic performance thereof, wherein the damper includes lead portions guiding voice coil lead wires to external connection terminals.

SUMMARY

The present invention seeks to provide a speaker unit having small dimensions, yet provides a linear response characteristic.

A speaker unit is provided which includes a speaker frame with a major front surface and a major back surface, two opposing (sound producing) membranes arranged in the major front surface and the major back surface, respectively, each being arranged to move up and down along a main speaker axis (perpendicular to major front and back surfaces of speaker). At least two drive units are provided for each of the two opposing membranes, each drive unit comprising a driver static part and a driver moving part, the driver moving part being fixedly connected to the associated one of the two opposing membranes. Each of the two opposing membranes are provided with a sealing edge suspension connected to a perimeter of the associated membrane and to the major front surface and major back surface, respectively, further comprising, for each driver moving part, a spider arm suspension connected on one side to the associated driver moving part and on another side to the speaker frame for suspending the driver moving part to the speaker frame in a flexible manner, wherein the sealing edge suspension is at least partially positioned above the associated drive units when viewed in a direction parallel to the main speaker axis. This positioning of the sealing edge suspension relative to the drive unit, and the associated spider arm suspension, allows the two opposing membranes to move along the main speaker axis without any chance of interference or blocking by other (internal) components of the speaker unit.

SHORT DESCRIPTION OF DRAWINGS

Figure 2A:
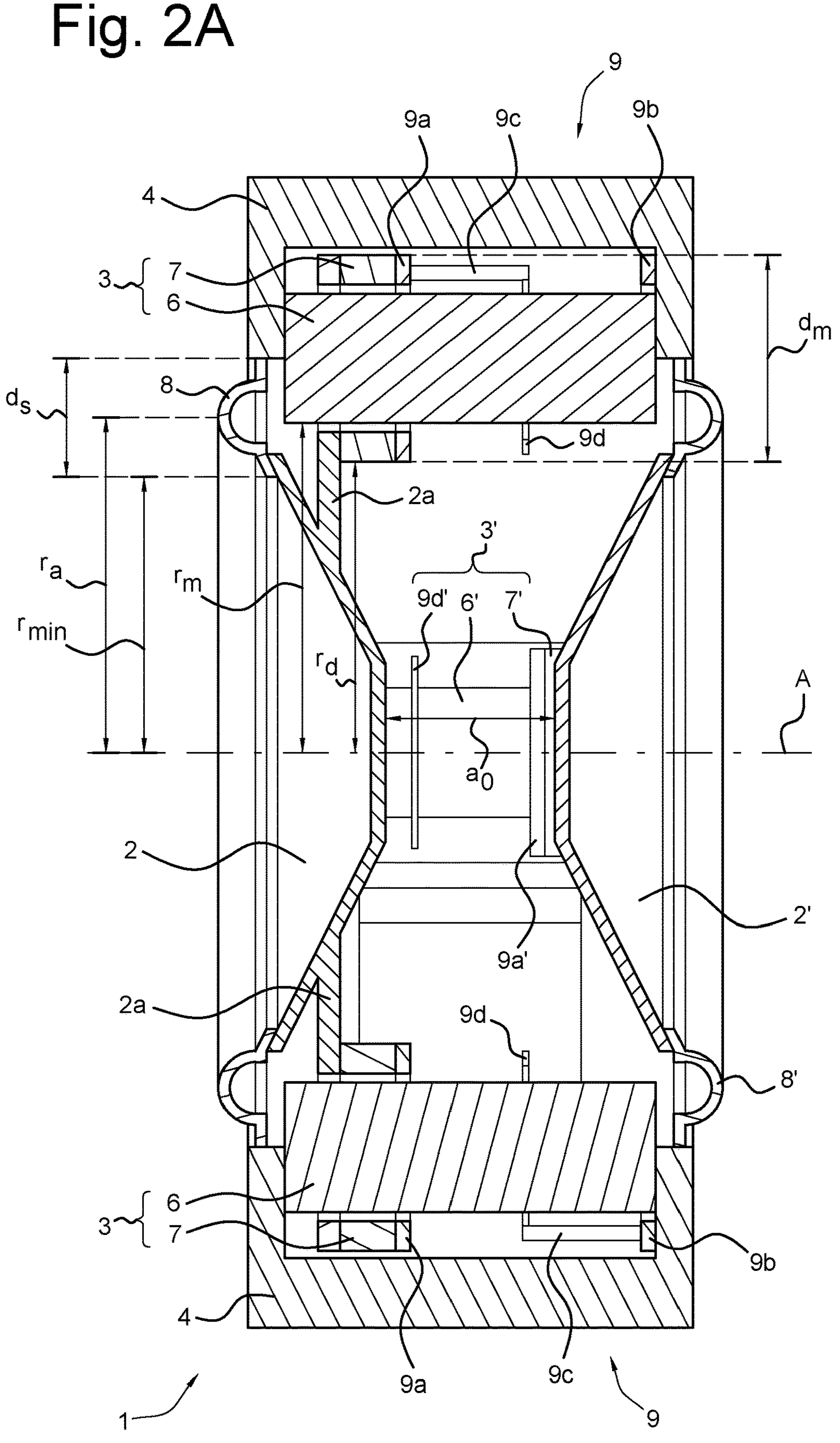
Figure 2B:
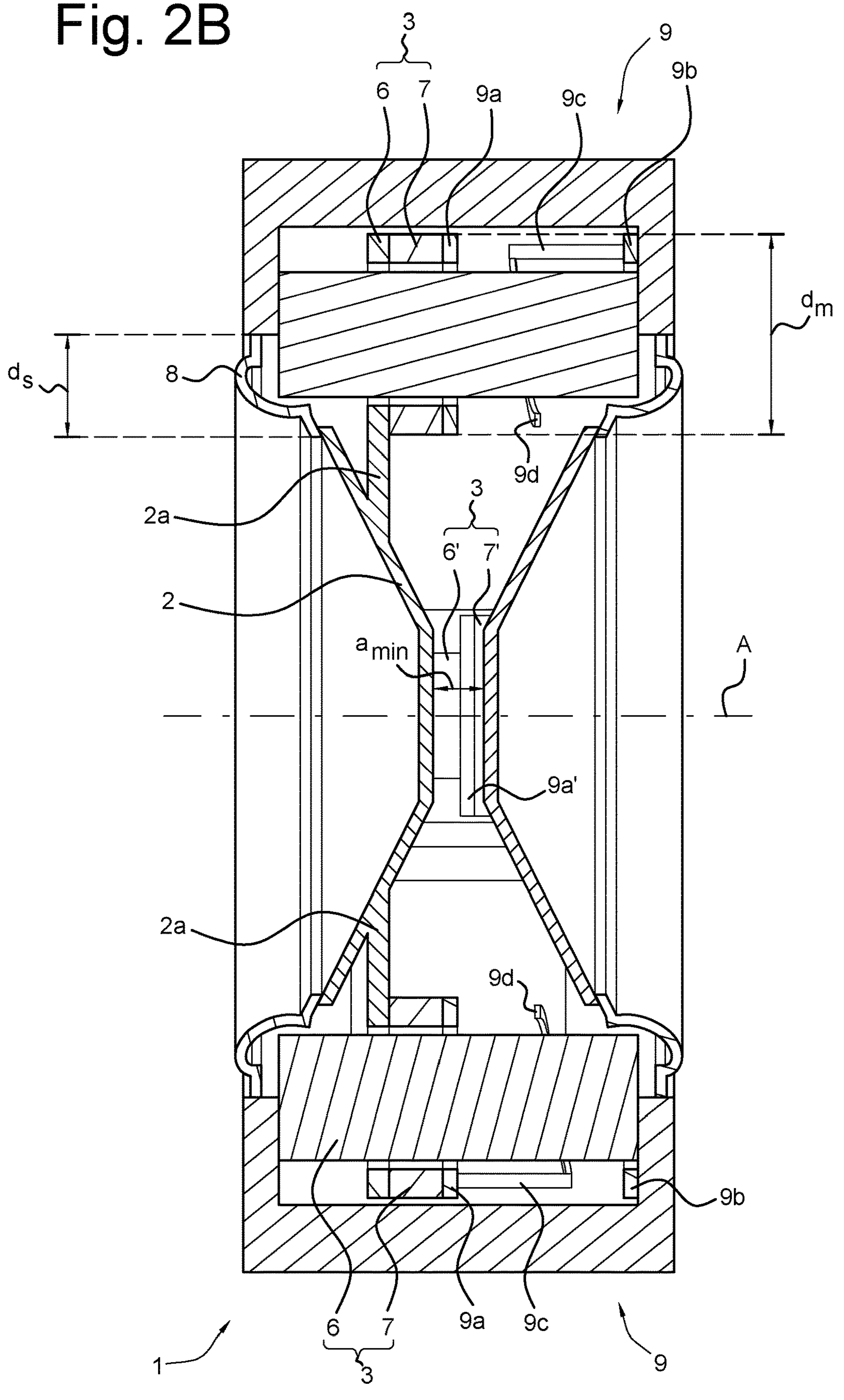
Figure 3A:
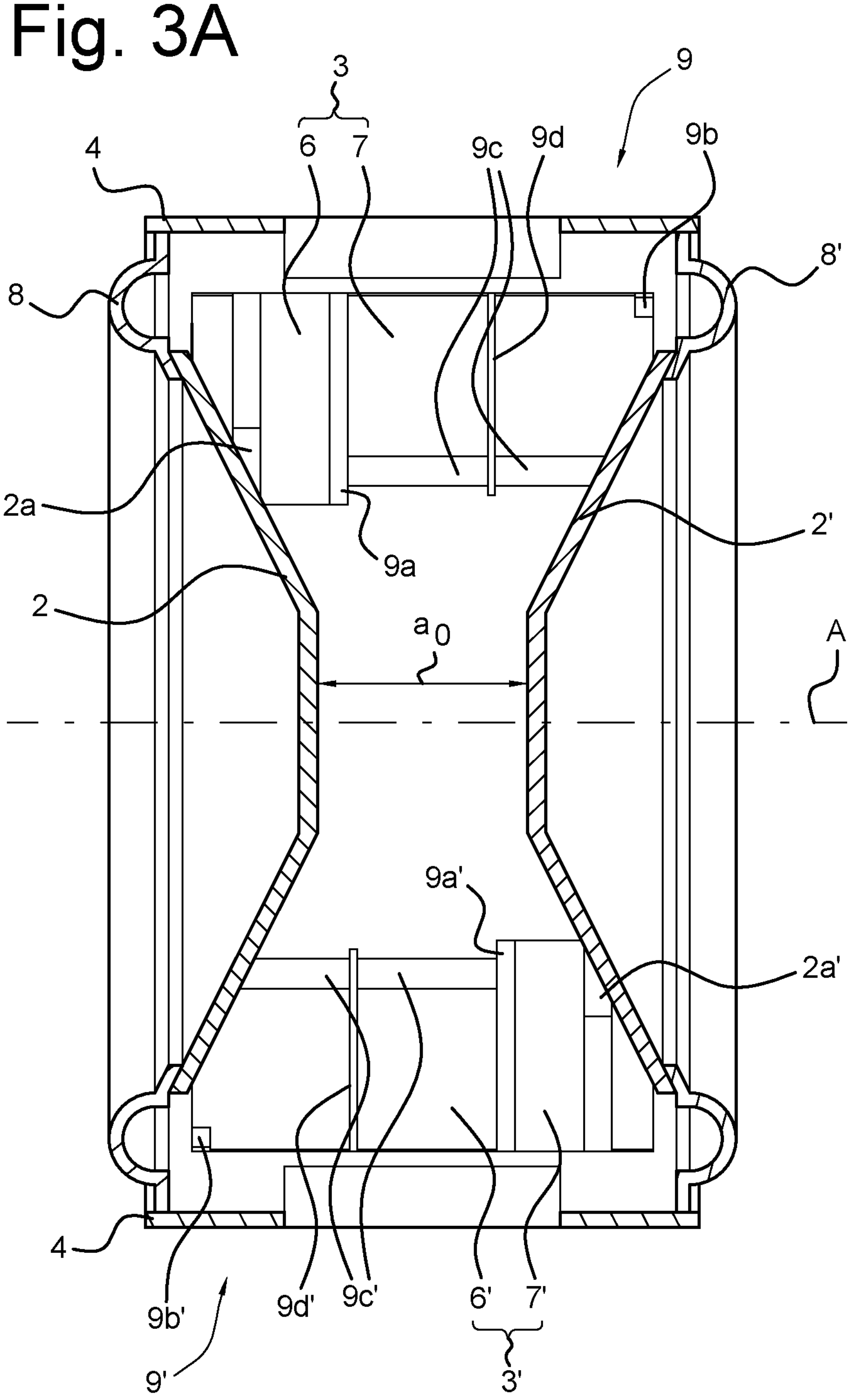
Figure 3B:
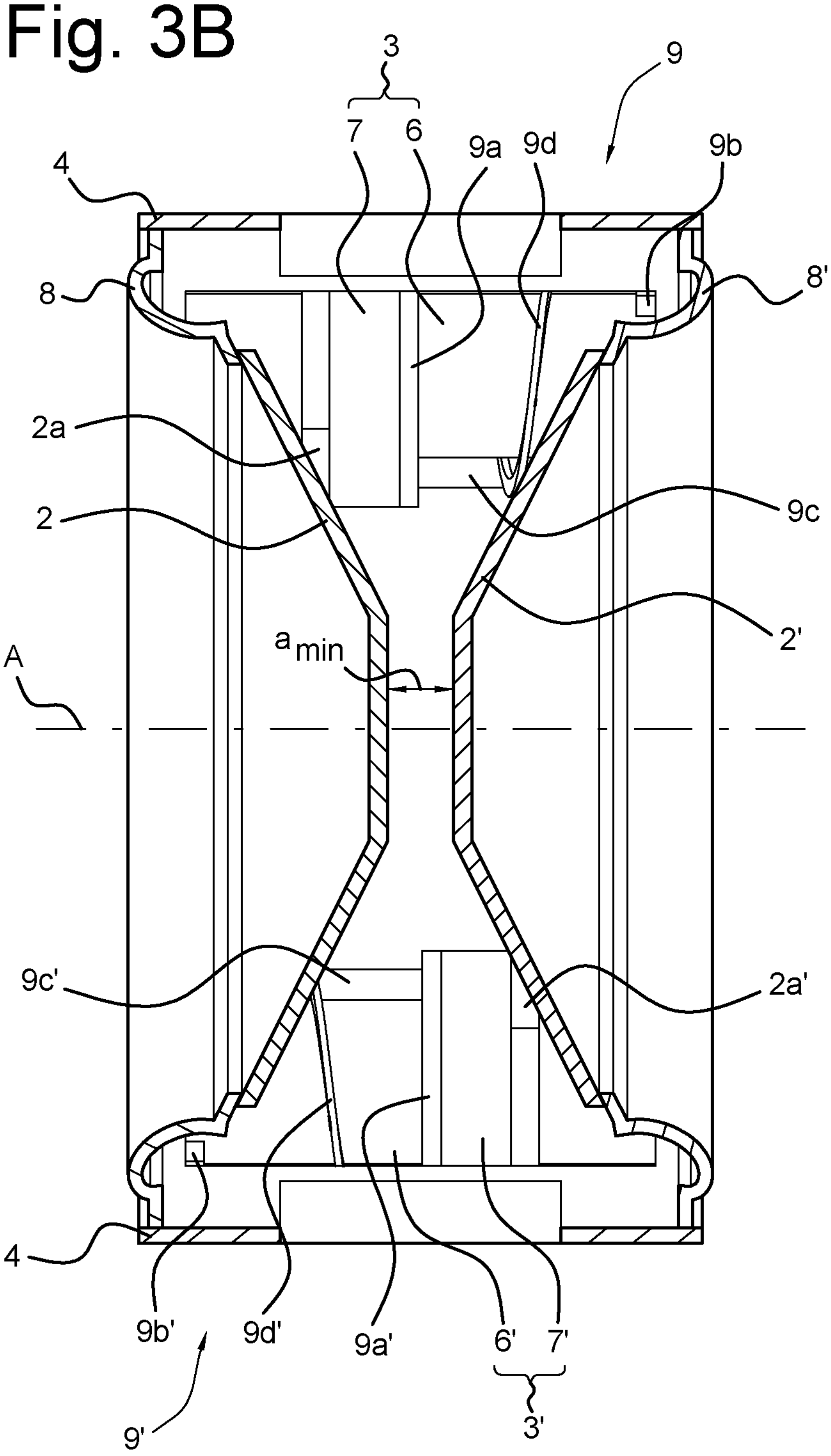

The present invention will be discussed in more detail below, with reference to the attached drawings, in which FIG. 1 shows a top projection view of the speaker unit according to an embodiment of the present invention;

FIGS. 2A and 2B show a cross sectional view of a speaker unit according to an embodiment of the present invention, FIG. 2A showing an at rest position of the speaker unit, and FIG. 2B showing the situation where the two membranes are closest to each other (inward excursion of both membranes);

FIGS. 3A and 3B a cross sectional view of the embodiments shown in FIGS. 2A and 2B, respectively, rotated over 45 degrees, along the line III-III in FIG. 1.

DESCRIPTION OF EMBODIMENTS

The present invention embodiments relate to a loudspeaker unit having an improved compactness of architecture using a dual membrane driver architecture, while keeping the membrane movement as linear as possible. Such loudspeaker unit could be a speaker device as described in the international patent publication WO2019/117706, filed 24 Apr. 2018 and titled Distributed Transducer Suspension Cones (DTSC), of the same inventors as the present application, which is incorporated herein by reference.

For improved linearity and air tight sealing a second suspension element is provided in embodiments, as discussed in detail below with reference to a particular embodiment. The arrangement of the membranes 2, 2', drive units 3, 3' and suspension components allow free movement of the membranes 2, 2' without collisions with any internal speaker unit components.

FIGS. 2A and 2B show a cross sectional view of a speaker unit 1 according to an embodiment, FIG. 2A showing an 'at rest' position of the speaker unit, and FIG. 2B showing the situation where the two membranes 2, 2' are closest to each other (inward excursion of both membranes 2, 2'. The cross section is across a diagonal of the speaker unit 1, as shown in FIG. 1 as lines II-II, showing that in this embodiment, two drive units 3 are provided for driving membrane 2, while only one drive unit 3' is visible which drives the other membrane 2'.

The speaker unit 1 has a speaker frame 4 with a major front surface and a major back surface, and two opposing (sound producing) membranes 2, 2' arranged in the major front surface and the major back surface, respectively, each being arranged to move up and down along a main speaker axis A. The major speaker axis in this embodiment is perpendicular to the major front and back surfaces of the speaker unit 1. At least two drive units 3, 3' for each of the two opposing membranes 2, 2' are provided, each drive unit 3, 3' comprising a driver static part (in this embodiment a magnet stack 6, 6') and a driver moving part (in this embodiment a voice coil 7, 7'), the driver moving part 7, 7' being fixedly connected to the associated one of the two opposing membranes 2, 2' (e.g. using a connection member 2*a* as shown in the embodiments in FIGS. 2A and 2B). Each of the two opposing membranes 2, 2' are provided with a sealing edge suspension 8, 8' connected to a perimeter of the associated membrane 2, 2' and to the major front surface and major back surface, respectively. For each driver moving part 7, 7', a spider arm suspension 9, 9' is connected on one side to the associated driver moving part 7, 7' and on another side to the speaker frame 4 for suspending the driver moving part 7, 7' to the speaker frame 4 in a flexible manner.

In some embodiments, the sealing edge suspension 8, 8' is at least partially positioned above the associated drive units 3, 3' when viewed in a direction parallel to the main speaker axis A.

To create a compact transducer for a speaker unit, it is required to make the stack of necessary components as low as possible. In electrodynamic transducers, several components are necessary such as coil(s), magnet(s), suspension(s), membrane(s), a frame to hold all components. In patent publication WO2020/160791 (of the same applicant as the present application), a cross shaped bellows suspension is disclosed. This bellows suspension shape has the benefit of allowing the air tight sealing suspension to stay on the inner perimeter of the membranes and spring-like suspension. A disadvantage of this cross-shape bellows structure is the suboptimal use of in-bounding-box surface area. To make use of the frontal surface of the driver as efficiently as possible, the orientation of the air tight sealing suspension is merged with the position of the drive units. The arrangement of drive units 3, 3' and suspensions 8, 8'; 9, 9' provides sufficient clearance for high excursion linear membrane movement without risk of collisions of internal components of the speaker unit 1.

In the embodiment described with reference to the drawings, the driver static part 6, 6' is a magnet stack 6, 6' and the driver moving part 7, 7' is a voice coil 7, 7'. The voice coil 7, 7' is moving relative to the magnet stack 6, 6' which is fixedly attached to the speaker frame 4. In further embodiments, the drive unit 3 may be kinematic reversed, having a driver static part 6, 6' formed by a voice coil fixedly attached to the speaker frame 4, and a driver moving part 7, 7' formed by a magnet or a stack of magnets fixedly attached to an associated one of the opposing membranes 2, 2'.

In further embodiments, for each drive unit 3, 3' the driver moving part 7, 7' is positioned at a minimum drive unit distance $r_d$ from the main speaker axis A, and the sealing edge suspension 8, 8' has a ring shape with a smallest radius $r_{min}$ which is larger than the minimum drive unit distance $r_d$.

These dimensions are also shown in the top projection view of the speaker unit of FIG. 1, wherein the projections of internal components onto the major front surface of the speaker unit 1 are shown, the front membrane 2 and front sealing edge suspension 8 being visible, and the other components (magnet stack 6, 6', voice coil 7, 7' and spider arm suspension 9, 9') being projected thereon along a line in parallel to the major speaker axis A as shown in FIGS. 2A and 2B.

The embodiments can also be defined using a further feature, wherein the sealing edge suspension 8, 8' has a ring shape with a largest radius $r_{min}+d_s$, the associated driver static parts 6, 6' being positioned on a magnet radius $r_m$ from the main speaker axis A, wherein the largest radius $r_{min}+d_s$ is larger than the magnet radius $r_m$. This ensures the sealing edge suspension 8, 8' is overlapping the magnet stacks 6, 6' when viewed along the major speaker axis A.

Note that in the embodiments shown, the spider arm suspension 9, 9' has a widest diameter which is less than a maximum diameter $d_m$ of the drive unit 3, 3'. As a result of this, in the embodiments, the drive unit 3, 3' and its directly associated components (i.e. spider arm suspension 9, 9') has a circumference when viewed along the major speaker axis A with the diameter $r_m$ positioned at a minimum drive unit distance $r_d$. The diameter of the voice coil 7, 7' is determining the volume within speaker frame 4 which is free of any interfering components.

As an alternative, embodiments may also be formulated where the sealing edge suspension 8, 8' has a substantially ring shaped form, wherein a projection of the ring shaped form on the major front surface along a direction parallel to the main speaker axis A at least partially overlaps with projections of the associated drive units 3, 3' on the major front surface along a direction parallel to the main speaker axis A. This is illustrated most clearly in the projection view of FIG. 1.

As shown most clearly in the cross sectional views of FIGS. 2A and 2B, the sealing edge suspension 8, 8' has an arc shaped cross section in a further group of embodiments. An apex of the arc shaped cross section is positioned on an apex radius $r_a$ from the main speaker axis A, the associated driver static parts 6, 6' being positioned on a magnet radius $r_m$ from the main speaker axis A, the apex radius $r_a$ being larger than the magnet radius $r_m$.

In the speaker unit 1, the membranes 2, 2' are brought in motion by the drive units 3, 3'. The membranes 2, 2' need to move in a linear motion, therefore the spider arm suspensions 9, 9' and the sealing edge suspensions 8, 8' are attached to each membrane 2, 2'. The spider suspension 9, 9' is attached to the membrane 2, 2' and the voice coil 7, 7', and positioned underneath the voice coil 7, 7' (taking the outward excursion direction of membrane 2 as facing up). The sealing edge suspension 8, 8' is attached to the membrane 2, 2' at the periphery thereof, and positioned above the voice coil 7, 7'. To make the frontal face (major front surface) of the speaker unit 1 as compact as possible, the middle of the sealing edge suspension 8, 8', i.e. the apex of the arc shaped cross section is situated above the drive unit 3, 3'. The apex is the middle of the arc shaped cross section, in other words equal to the outer diameter of the bending part (arc shaped cross section) of the sealing edge suspension 8, 8', plus the inner diameter of the bending part, divided by two. As a result, when the membrane 2, 2' is in motion, the arc shaped cross section of the sealing edge suspension 8, 8' will bend over the magnet stack 6, 6' of the drive unit 3, 3' (as the voice coil 7, 7' is moving inward in the speaker frame 4. Because of the positioning of the sealing edge suspension 8, 8' and the drive unit 3, 3, the membrane 2, 2' is able to move within the speaker frame 4 without collisions with other components of the speaker unit 1.

In an even further embodiment, a projection on the major front surface of the spider arm suspension 9, 9' (see top projection view of FIG. 1) in a direction parallel to the main speaker axis A is within a projection on the major front surface of the associated driver moving part 7, 7'. This ensures that the other membrane 2', 2 associated with the spider arm suspension 9, 9' cannot be blocked by this component. As is shown in the exemplary embodiments of FIG. 1-3B, the spider arm suspension element 9, 9 is a flexible material element, with a first attachment part 9*a* attached to the associated voice coil 7, 7', and a second attachment part 9*b* attached to the speaker frame 4 opposite to the associated membrane 2, 2'. In between the first and second attachment parts 9*a*, 9*b*, e.g. two connection members 9*c* and a semi-circular bending member 9*d* are provided, allowing the spider arm suspension element 9, 9' to have a variable height while all components thereof stay within the maximum diameter $d_m$ of the associated drive element 3, 3'.

In more generic wording, the present invention embodiments relate to a speaker unit 1 comprising a speaker frame 4 with first and second opposing sides; and first and second membranes 2, 2' arranged in the first and second sides, respectively, the first and second membranes 2, 2' being moveable along a main speaker axis A. For each of the first and second membranes 2, 2' a plurality of drive units 3, 3' is present, the drive units 3, 3' each comprising a driver static part 6, 6' and a driver moving part 7, 7', each driver moving part 6, 6' being fixedly connected to the respective membrane 2, 2' and with a spider arm suspension 9, 9' connected on one side to the respective driver moving part 7, 7' and on the other side to the speaker frame 4, and a sealing edge suspension 8, 8' connected to the perimeter of the respective membrane 2, 2' and to the respective side and positioned at least partially adjacent to the respective drive unit 3, 3'. In an exemplary embodiment, each spider arm suspension 9, 9' comprises a first attachment part 9*a* connecting to the associated driver moving part 7, 7', a second attachment part 9*b* connected to the frame 4 and at least one connection member 9*c* and a semi-circular bending member 9*d* between the first and second attachment parts 9*a*, 9*b*, wherein the semi-circular bending member 9*d* extends around the driver static part 6, 6'.

As discussed above, each membrane 2, 2' comprises membrane connection elements 2*a*, 2*a'* connecting the membrane 2, 2' to an associated driver moving part 7, 7'. The connection element 2*a*, 2*a'* may form an integrated element of each membrane 2, 2', or alternatively, it may be a separate element connected to the voice coil 7, 7' and the membrane 2, 2'. In order to ensure proper operation, each membrane connection element 2*a*, 2*a'* is positioned at a predetermined distance from the other one of the opposing membranes 2, 2' when the opposing membranes 2, 2' are at a minimum distance ($a_{min}$) of each other during operation (see FIGS. 2B and 3B). This ensures that even at the minimum distance $a_{min}$ the connection element 2*a*, 2*a'* is not in contact with the (back side of) membrane 2, 2'.

In the exemplary embodiments shown in and described with reference to FIG. 1-3B, each membrane 2, 2' is connected to two associated drive units 3, 3' positioned at opposite sides of the membrane 2, 2'. In even further embodiments, the at least two drive units 3, 3' for each of the two opposing membranes 2, 2' are positioned equidistantly from the speaker main axis A. This allows an effective use of the entire membrane 2, 2' surface with as little as possible non-linearities being introduced. The drive units 3, 3' positioned at an edge of the membrane 2, 2', can also be equiangular positioned, i.e. at 180 degrees (two drive units), 120 degrees (three drive units), 90 degrees (four drive units). Similar features as described above for exemplary embodiments having two drive units 3, 3' for each membrane 3, 3' can also be applied for a higher number of drive units 3, 3' per membrane 2, 2'.

In even further embodiments, the two opposing membranes 2, 2' each comprise a frontal sound producing surface with a conical surface, a frusto-conical surface, or a flat surface. In the embodiments shown in the figures and discussed above, the membranes 2, 2' have a frusto-conical shape, with a flat surface in the middle of the conus shape. The other surface shapes are also possible to be implemented, with the proper adaption of possibly interfering components of the speaker unit 1, as discussed above for all other exemplary embodiments.

The present invention has been described above with reference to a number of exemplary embodiments as shown in the drawings. Modifications and alternative implementations of some parts or elements are possible, and are included in the scope of protection as defined in the appended claims.

The invention claimed is:

1. A speaker unit comprising:

a speaker frame with a major front surface and a major back surface, a first membrane coupled to the major front surface and an opposing second membrane coupled to the major back surface, the first and second membranes configured to move inward and outward along an excursion axis;

a first drive unit coupled to the first membrane, the first drive unit comprising a first driver static part and a first driver moving part coupled to the first membrane;

a second drive unit coupled to the second membrane, the second drive unit comprising a second driver static part and a second driver moving part coupled to the second membrane;

a first sealing edge suspension coupling the first membrane to the front major surface, the first sealing edge suspension comprising:

a radially inner end coupled to a perimeter of the first membrane;

a radially outer end coupled to the major front surface; and an arc shaped portion between the radially inner end and the radially outer end, wherein an apex of the arc shaped portion is positioned on an apex radius ($r_a$) from the excursion axis, a radially inner surface of the first drive unit is positioned on a magnet radius ($r_m$) from the main speaker axis (A), the apex radius ($r_a$) being larger than the magnet radius ($r_m$), wherein the first sealing edge suspension is configured such that the are shaped portion bends over the er surface of the first drive unit when the first membrane moves inward along the excursion axis; and a second sealing edge suspension coupling the second membrane to the back major surface.

2. The speaker unit of claim 1, wherein the first sealing edge suspension is configured such that the radially inner end of the first sealing edge can overlap the first drive unit along the excursion axis.

3. The speaker unit of claim 2, wherein the first sealing edge suspension is configured such that the radially inner end of the first sealing edge suspension overlaps the first drive unit along the excursion axis when the first membrane is at rest.

4. The speaker unit of claim 2, wherein the first sealing edge suspension is configured such that the radially inner end of the first sealing edge suspension overlaps the first drive unit along the excursion axis when the first membrane moves inward along the excursion axis.

5. The speaker unit of claim 1, wherein, for each drive unit, the driver moving part is positioned at a minimum drive unit distance ($r_d$) from the excursion axis, and the first sealing edge suspension has a ring shape with a smallest radius ($r_{min}$) which is larger than the minimum drive unit distance ($r_d$).

6. The speaker unit of claim 1, wherein the sealing edge suspension has a ring shape with a largest radius ($r_{min}+d_s$), the associated driver static parts being positioned on a magnet radius ($r_m$) from the excursion axis, wherein the largest radius ($r_{min}+d_s$) is larger than the magnet radius ($r_m$).

7. The speaker unit of claim 1, wherein the driver static part comprises a magnet stack and the driver moving part comprises a voice coil.

8. The speaker unit of claim 1, wherein at least two drive units for each of the two opposing membranes are positioned equidistantly from the excursion axis.

9. A speaker unit comprising:

a speaker frame with a major front surface and a major back surface, a first membrane coupled to the major front surface and an opposing second membrane coupled to the major back surface, the first and second membranes configured to move inward and outward along an excursion axis;

a first drive unit coupled to the first membrane, the first drive unit comprising a first driver static part and a first driver moving part coupled to the first membrane;

a second drive unit coupled to the second membrane, the second drive unit comprising a second driver static part and a second driver moving part coupled to the second membrane;

a first sealing edge suspension coupling the first membrane to the front major surface, the first sealing edge suspension comprising:

a radially inner end coupled to a perimeter of the first membrane; and a radially outer end coupled to the major front surface of the speaker frame, wherein the first sealing edge suspension con re shaped portion between the radially inner end and the radially out end, wherein an apex of the are shaped portion is positioned an apex radius ($r_a$) from the excursion axis, a radially inner surface of the first drive unit is positioned on a magnet radius ($r_m$) from the excursion axis, the as ex radius ($r_a$) being larger than the magnet radios ($r_m$), and wherein the first sealing edge suspension is configured such that the radially inner end of the first sealing edge can overlap the first drive unit along the excursion axis; and a second sealing edge suspension coupling the second membrane to the back major surface.

10. The speaker unit of claim 9, wherein the first sealing edge suspension is configured such that the radially inner end of the first sealing edge suspension overlaps the first drive unit along the excursion axis when the first membrane is at rest.

11. The speaker unit of claim 9, wherein the first sealing edge suspension is configured such that the radially inner end of the first sealing edge suspension overlaps the first drive unit along the excursion axis when the first membrane moves inward along the excursion axis.

12. The speaker unit of claim 9, wherein, for each drive unit, the driver moving part is positioned at a minimum drive unit distance ($r_d$) from the excursion axis, and the sealing edge suspension has a ring shape with a smallest radius ($r_{min}$) which is larger than the minimum drive unit distance ($r_d$).

13. The speaker unit of claim 9, wherein the first sealing edge suspension has a ring shape with a largest radius ($r_{min}+d_s$), the associated driver static parts being positioned on a magnet radius ($r_m$) from the excursion axis, wherein the largest radius ($r_{min}+d_s$) is larger than the magnet radius ($r_m$).

14. The speaker unit of claim 9, wherein the driver static part comprises a magnet stack and the driver moving part comprises a voice coil.

15. The speaker unit of claim 9, wherein at least two drive units for each of the two opposing membranes are positioned equidistantly from the excursion axis.

16. A speaker unit comprising:

a speaker frame with a major front surface and a major back surface;

a first membrane coupled to the major front surface and an opposing second membrane coupled to the major back surface;

a first drive unit coupled to the first membrane configured to move the first membrane inward and outward over a first range along an excursion axis of the speaker unit;

a second drive unit coupled to the second membrane, the second drive unit configured to move the second membrane inward and outward over a second range along the excursion axis;

a first suspension having a radially inner end portion coupled to the first membrane and a radially outer end portion coupled to the speaker frame, wherein the first suspension comprises an arc shaped portion between the radially inner end portion and the radially outer end portion, wherein an apex of the are shaped portion is positioned on an apex radius ($r_s$) from the excursion axis a radially inner surface of the first drive unit is positioned on a magnet radius ($r_m$) from the excursion axis, the apex radius ($r_a$) being larger than 1 net radius ($r_m$), wherein the radially inner end portion of the first suspension overlaps the first drive unit along the excursion axis during at least a portion of the first range of movement of the first membrane along the excursion axis; and a second suspension coupling the second membrane to the back major surface.

17. The speaker unit of claim 16, wherein the first suspension is configured such that the radially inner end portion of the first suspension overlaps the first drive unit along the excursion axis when the first membrane is at rest.

18. The speaker unit of claim 16, wherein the first suspension is configured such that the radially inner end portion of the first suspension overlaps the first drive unit along the excursion axis when the first membrane moves inward along the excursion axis.

* * * * *